US012263425B2

(12) United States Patent
Kim et al.

(10) Patent No.: US 12,263,425 B2
(45) Date of Patent: Apr. 1, 2025

(54) WATER PURIFYING APPARATUS AND REFRIGERATOR INCLUDING THE SAME

(71) Applicant: LG Electronics Inc., Seoul (KR)

(72) Inventors: Youngjae Kim, Seoul (KR); Gyeonghwan Kweon, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 189 days.

(21) Appl. No.: 17/173,068

(22) Filed: Feb. 10, 2021

(65) Prior Publication Data

US 2021/0291090 A1    Sep. 23, 2021

(30) Foreign Application Priority Data

Mar. 23, 2020    (KR) .................... 10-2020-0035197

(51) Int. Cl.
*B01D 35/34*    (2006.01)
*B01D 29/33*    (2006.01)
(Continued)

(52) U.S. Cl.
CPC ............. *B01D 35/34* (2013.01); *B01D 29/33* (2013.01); *C02F 1/003* (2013.01); *F25D 23/028* (2013.01);
(Continued)

(58) Field of Classification Search
CPC ................ C02F 2201/004; C02F 2201/006
(Continued)

(56) References Cited

U.S. PATENT DOCUMENTS 7,303,673 B1 * 12/2007 Glazewski ............. B01D 27/07
  210/450
8,132,675 B2 * 3/2012 Calcaterra .............. F02M 37/32
  210/450
(Continued)

FOREIGN PATENT DOCUMENTS

JP    2001259378    9/2001
JP    2006082034    3/2006
(Continued)

OTHER PUBLICATIONS

Office Action in Korean Appln. No. 10-2020-0035197, dated May 20, 2021, 12 pages (with English translation).
(Continued)

*Primary Examiner* — Benjamin M Kurtz
(74) *Attorney, Agent, or Firm* — Fish & Richardson P.C.

(57) ABSTRACT

A water purifying apparatus for a refrigerator includes a head, a filter housing inserted into the head, a filtering member inside the filter housing, a head insertion portion inserted into the head and coupled to the head, and a fixing portion protruding along a circumference of the head insertion portion, and a sealing member fixed to the fixing portion and disposed along a circumference of the filter housing. The sealing member includes a sealing portion configured to protrude outward along the circumference of the filter housing so as to be in close contact with the inner surface of the head, a hook portion disposed below the fixing portion to be restricted by the fixing portion, and a connection portion configured to connect the sealing portion to the hook portion.

18 Claims, 14 Drawing Sheets

(51) Int. Cl.
  *C02F 1/00* (2023.01)
  *F25D 23/02* (2006.01)
  *F25D 23/12* (2006.01)

(52) U.S. Cl.
  CPC ...... *F25D 23/126* (2013.01); *B01D 2201/302* (2013.01); *B01D 2201/304* (2013.01); *B01D 2201/4046* (2013.01); *C02F 2201/004* (2013.01); *C02F 2307/12* (2013.01); *F25D 2323/121* (2013.01)

(58) Field of Classification Search
  USPC .......................................................... 210/450
  See application file for complete search history.

(56) References Cited

U.S. PATENT DOCUMENTS 8,177,972 B2 * 5/2012 Grummert ............ B01D 29/111
  210/232

2016/0158674 A1 * 6/2016 Johansen ............... F16J 15/104
  277/637
2017/0274304 A1 * 9/2017 You ...................... B01D 35/306
2017/0282105 A1 10/2017 You et al.

FOREIGN PATENT DOCUMENTS

| | | |
|---|---|---|
| KR | 1020010022090 | 3/2001 |
| KR | 200249646 Y1 | 11/2001 |
| KR | 200263107 | 2/2002 |
| KR | 100494595 | 6/2005 |
| KR | 101780168 | 9/2017 |
| KR | 20170109987 | 10/2017 |
| KR | 20180106018 | 10/2018 |

OTHER PUBLICATIONS

Office Action in Indian Appln. No. 202114005889, dated Jan. 19, 2022, 6 pages.
Korean Office Action in Korean Application No. 10-2020-0035197, dated Feb. 1, 2021, 10 pages (with Machine translation).

\* cited by examiner

WATER PURIFYING APPARATUS AND REFRIGERATOR INCLUDING THE SAME

CROSS-REFERENCE TO RELATED APPLICATIONS

The present application claims priority under 35 U.S.C. 119 and 35 U.S.C. 365 to Korean Patent Application No. 10-2020-0035197, filed on Mar. 23, 2020, which is hereby incorporated by reference in its entirety.

BACKGROUND

The present disclosure relates to a water purifying apparatus and a refrigerator including the same.

In general, a water purifying apparatus is configured to purify supplied water using a filter or a filter medium and includes a device that purifies water in a water tube or a tank into a drinkable state.

Such a water purifying apparatus that supplies drinkable water is representative of a water purifier. Recently, the whole or a portion of the water purifying apparatus may be provided in a refrigerator to receive purified water through the refrigerator or make ice using the purified water.

The water purifying apparatus may be provided in the refrigerator and be configured to dispense purified water together with a dispenser provided in a door so that a user dispenses the purified water from the outside.

A water purifying apparatus and a refrigerator including the water purifying apparatus are disclosed in Korean Patent Registration No. 10-1780168.

However, in such a refrigerator, when a filter is mounted, the filter is rotatably mounted while the filter is mounted and fixed. Due to this structure, an O-ring may be separated from a portion at which the filter is mounted, or the O-ring may be changed in position to cause leakage.

Also, a structure of the portion on which the O-ring is seated on an upper end of a filter housing cap may be complicated to cause undercut during injection molding. As a result, to prevent the undercut from occurring, a precise injection molding process is required, or post-processing is necessary to cause deterioration in production and assembly.

Also, the precision in shape due to the occurrence of the undercut at the portion, at which the O-ring is mounted, or aging of a mold may be deteriorated, and thus, the O-ring may not be in completely contact with the filter housing to cause water leakage.

Particularly, in the structure in which the filter is mounted while rotating, the adhesion of the O-ring may be worse, and thus, the water leakage may more increase due to the positional separation of the O-ring or the deterioration of the adhesion.

SUMMARY

Embodiments provide a water purifying apparatus in which, when a filter fixed to a head by rotating in a direction crossing a direction, in which the filter is inserted into the head, is mounted, water leakage between the filter and the head is effectively prevented.

Embodiments also provide a water purifying apparatus in which an undercut protruding from an upper end of a housing is removed, and a housing cap and a sealing member are in close contact with each other to prevent water from being leaking.

Embodiments also provide a filter structure, in which a filter housing has a simple structure to improve production and assembly, and a water purifying apparatus including the same.

Embodiments also provide a water purifying apparatus including a sealing member that is capable of providing an area greater than area to be sealed between a housing cap and a head to prevent water from leaking to the outside of a filter housing and a refrigerator including the same.

A water purifying apparatus according to an embodiment includes a fixing portion spaced downward from an upper end of a filter housing and a sealing member extending downward from an upper end of the fixing portion to seal a gap between the filter housing and the head, thereby preventing water from leaking.

In one embodiment, a water purifying apparatus includes: a head to which a water inlet tube and a water outlet tube are connected; a filter housing inserted into the head to be detachably mounted, the filter housing being restricted to the head by rotation thereof; a filtering member accommodated inside the filter housing; a head insertion portion inserted into the head and coupled to the head, the head insertion portion having an upper end that is opened so that water is injected and discharged through the upper end of the head insertion portion; and a fixing portion configured to protrude along a circumference of the head insertion portion; and a sealing member fixed to the fixing portion and disposed along a circumference of the filter housing, the sealing member being in close contact with an inner surface of the head to seal a gap between the head and the head insertion portion, wherein the sealing member includes: a sealing portion configured to protrude outward along the circumference of the filter housing so as to be in close contact with the inner surface of the head; a hook portion disposed below the fixing portion to be restricted by the fixing portion; and a connection portion configured to connect the sealing portion to the hook portion.

The filter housing may include: a body having an opened top surface and configured to define a space in which the filtering member is accommodated; and a housing cap coupled to the opened top surface of the housing body.

The head insertion portion may further include a support portion disposed below the fixing portion and configured to protrude outward along the circumference of the head insertion portion so as to be in contact with a lower end of the sealing member.

The sealing portion may have an O-ring shape having a circular cross-section, and both side ends of the sealing portion may further protrude outside the filter housing than both side ends of the connection portion.

An inner surface of the connection portion may include a groove that is recessed in a shape corresponding to the fixing portion.

A thickness of the hook portion in a horizontal direction may be greater than a thickness of the connection portion in the horizontal direction, based on a lower end of the sealing member.

The housing cap may further include a protrusion portion configured to protrude upward from an inside of the head insertion portion, and the protrusion portion may have an outer diameter less than an inner diameter of the head insertion portion.

The sealing member may further include an extension portion configured to extend upward from an upper end of the sealing portion so as to be in contact with the protrusion portion.

An inner surface of the extension portion may include: a first extension portion configured to protrude in a central direction of the head insertion portion at a position corresponding to the protrusion portion; and a second extension portion configured to extend downward from a lower end of the first extension portion, the second extension portion being connected to the sealing portion, wherein a thickness of the first extension portion in a horizontal direction may be greater than a thickness of the second extension portion in the horizontal direction, based on a lower end of the sealing member.

In another embodiment, a refrigerator includes a cabinet configured to define a storage space, a door configured to open and close the cabinet, and a water purifying apparatus provided in the storage space to purify supplied water. The water purifying apparatus includes a head to which a water inlet tube and a water outlet tube are connected, a filter housing inserted into the head to be detachably mounted, the filter housing being restricted to the head by rotation thereof, a filtering member accommodated inside the filter housing, a head insertion portion inserted into the head and coupled to the head, the head insertion portion having an upper end that is opened so that water is injected and discharged through the upper end of the head insertion portion, a fixing portion configured to protrude along a circumference of the head insertion portion, and sealing member fixed to the fixing portion and disposed along a circumference of the filter housing. The sealing member is in close contact with an inner surface of the head to seal a gap between the head and the head insertion portion. The sealing member includes a sealing portion configured to protrude outward along the circumference of the filter housing so as to be in close contact with the inner surface of the head, a hook portion disposed below the fixing portion to be restricted by the fixing portion, and a connection portion configured to connect the sealing portion to the hook portion.

An inner surface of the connection portion may include a groove that is recessed in a shape corresponding to the fixing portion.

A thickness of the hook portion in a horizontal direction may be greater than a thickness of the connection portion in the horizontal direction, based on a lower end of the sealing member.

The head insertion portion may further include a support portion disposed below the fixing portion and configured to protrude outward along the circumference of the head insertion portion so as to be in contact with a lower end of the sealing member.

The head insertion portion may include a protrusion portion configured to protrude upward from an inside of the head insertion portion, and the sealing member may further include an extension portion configured to extend upward from an upper end of the sealing portion so as to be in contact with the protrusion portion.

An inner surface of the extension portion may include: a first extension portion configured to protrude in a central direction of the head insertion portion at a position corresponding to the protrusion portion; and a second extension portion configured to extend downward from a lower end of the first extension portion, the second extension portion being connected to the sealing portion, wherein a thickness of the first extension portion in a horizontal direction may be greater than a thickness of the second extension portion in the horizontal direction, based on a lower end of the sealing member.

DETAILED DESCRIPTION OF THE EMBODIMENTS

Hereinafter, detailed embodiments will be described in detail with reference to the accompanying drawings. However, the scope of the present disclosure is not limited to proposed embodiments of the present invention, and other regressive inventions or other embodiments included in the scope of the spirits of the present disclosure may be easily proposed through addition, change, deletion, and the like of other elements.

Figure 1:
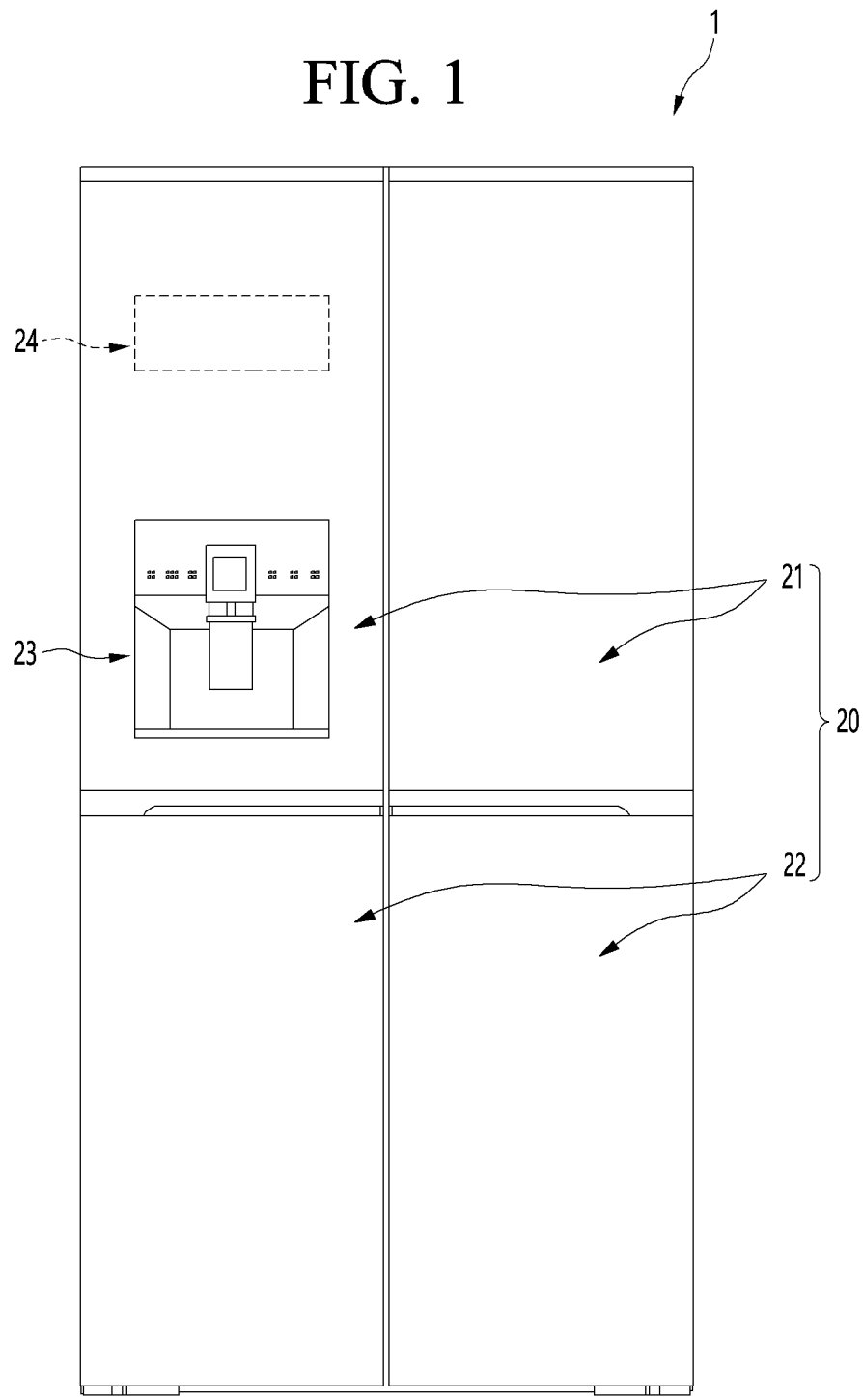
FIG. 1 is a front view of a refrigerator having a filter structure according to an embodiment.
Figure 2:
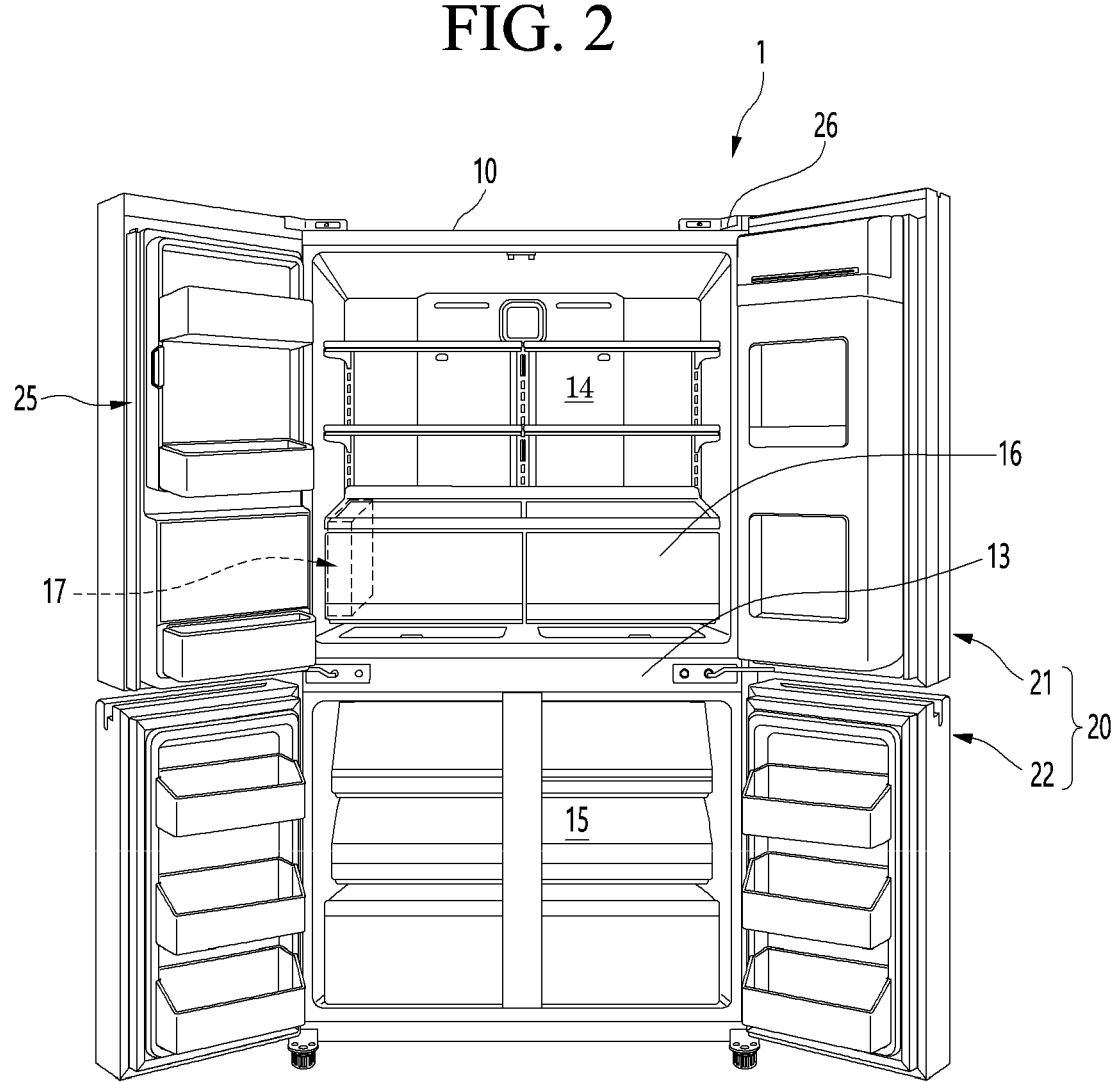
FIG. 2 is a front view illustrating a state in which a door of the refrigerator is opened.

FIG. 1 is a front view of a refrigerator according to an embodiment. Also, FIG. 2 is a front view illustrating a state in which a door of the refrigerator is opened.

Referring to drawings, a refrigerator 1 according to an embodiment includes a cabinet 10 defining a storage space and a door 20 opening and closing the storage space of the cabinet 10. Here, an outer appearance of the refrigerator 1 may be defined by the cabinet 10 and the door 20.

The storage space is divided vertically based on a barrier 13 and may be constituted by an upper refrigerating compartment 14 and a lower freezing compartment 15. Also, the freezing compartment 15 may be further divided horizontally.

The door 20 may include a refrigerating compartment door 21 and a freezing compartment door 22, which respectively independently open and close the refrigerator compartment 14 and the freezer compartment 15. Both the refrigerating compartment door 21 and the freezing compartment door 22 are rotatably connected to the cabinet 10 by a hinge device 26 to open and close the refrigerating compartment 14 and the freezing compartment 15.

A dispenser 23 and an ice maker 24 may be provided in one of the pair of refrigerating compartment doors 21.

The dispenser 23 may be disposed on a front surface of the refrigerating compartment door 21, and a user may manipulate the dispenser 23 from the outside to dispense water or ice. Also, an ice making chamber 25 is provided above the dispenser 23. The ice making chamber 25 is an insulating space in which ice is made and stored, and the ice maker 24 may be accommodated in the ice making chamber and be opened and closed by a separate door.

A plurality of shelves and drawers 16 configured to store food may be provided in the refrigerating compartment 14.

Also, a water purifying apparatus 17 may be provided at one side of the refrigerating compartment 14 to purify water to be supplied to the dispenser 23 and the ice maker 24. The water purifying apparatus 17 may be disposed between a storage space of the drawer 16 and a wall surface and be shielded by a front surface of the drawer 16. Of course, the mounted position of the water purifying apparatus 17 is not limited to one side of the drawer 16. For example, the water purifying apparatus 17 may be provided in the refrigerating compartment 14 or a region of the refrigerating compartment 14 including the refrigerating compartment door 21.

Figure 3:
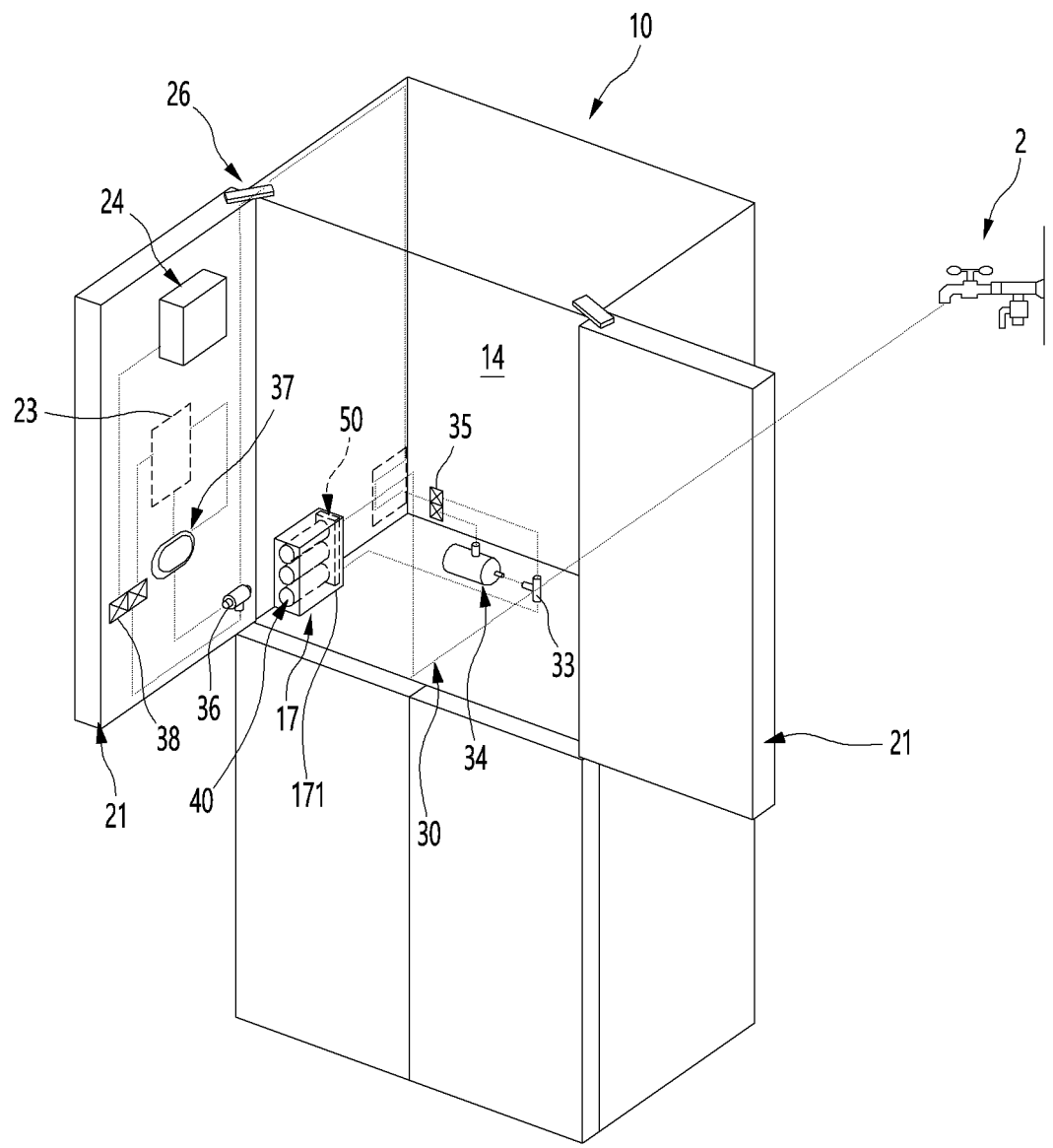
FIG. 3 is a schematic view illustrating an arranged structure of a water supply flow path of the refrigerator.

FIG. 3 is a schematic view illustrating an arranged structure of a water supply flow path of the refrigerator.

As illustrated in the drawings, the refrigerator 1 may purify or cool water supplied from an external water source to dispense the purified water to the dispenser 23 or may include a water supply flow path through which the purified water is supplied to the dispenser 23 or the ice maker 24.

The water supply flow path 30 may be directly connected to the water supply source 2 such as a water tube outside of the refrigerator and be inserted into a space inside the refrigerator through a tube guide 19 mounted inside the cabinet 10 and then connected to an inlet inside the refrigerator.

The water supply flow path 30 connects the water purifying apparatus 17 to a first branch tube 33, and water supply flow paths branched from the first branch tube 33 are connected to a main water tank 34 and a first branch valve 35, respectively.

The water supply flow path 30 connected to an outlet of the first branch valve 35 may extend along a side wall inside the cabinet 10 or a rear wall outside the cabinet through the tube guide 19 and then extend along an upper surface. Then, the water supply flow path 30 may be directed to the refrigerating compartment door 21 via a door hinge 26

Also, the water supply flow path of the refrigerating compartment door 21 is branched by a second branch tube 36 and connected to an inlet of a sub water tank 37 and a second branch valve 38. The sub water tank 37 is connected to the dispenser 23 so that cooled water is dispensed through the dispenser 23.

Also, the outlet of the second branch valve 38 may be connected to the dispenser 23 and the ice maker 24 by the water supply flow path 30 to supply purified water to the dispenser 23 and the ice maker 24.

As described above, the water purified through the water purifying apparatus 17 may be cooled and supplied to the dispenser 23 or may be supplied to the dispenser 23, or the purified water without being cooled may be supplied to the ice maker 24.

Also, the water purifying apparatus 17 may include a plurality of filters 40 configured to purify water supplied as a whole and a head unit 50 to which the filters 40 are coupled and which is connected to a flow path through which water flows. Also, a case 171 in which the filters 40 and the head unit 50 are accommodated may be further provided.

Figure 4:
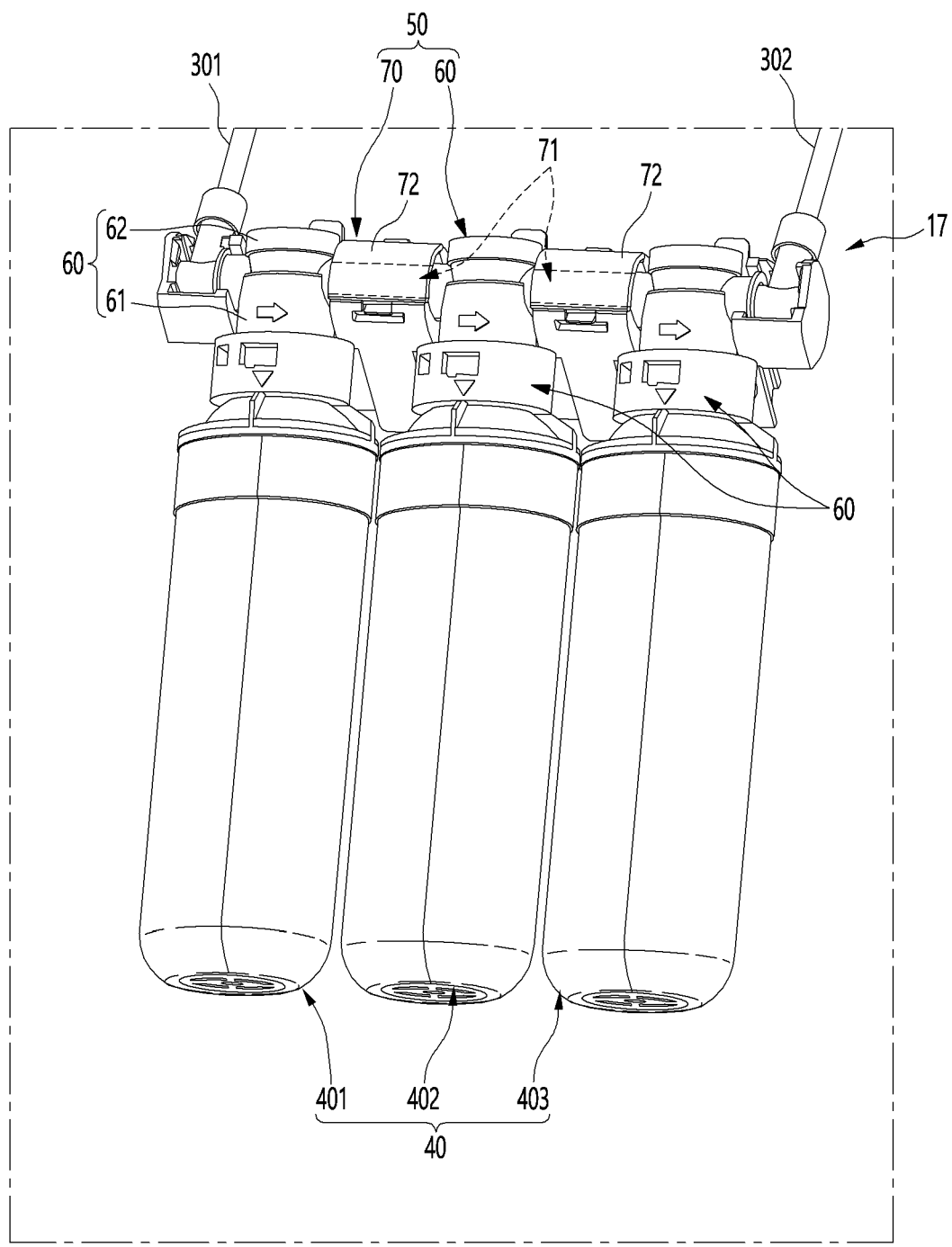
FIG. 4 is a perspective view illustrating a structure of a water purifying apparatus.

FIG. 4 is a perspective view illustrating a structure of the water purifying apparatus.

As illustrated in the drawings, the water purifying apparatus 17 may include the plurality of filters 40 and the head unit 50. The filter 40 may be provided in plurality. In an embodiment, the filters may include a first filter 401 connected to a water inlet side of the head unit 50, a third filter connected to a water outlet side of the head unit 50, a second filter 402 disposed between the first filter 401 and the third filter 403 to purify the water passing through the water purifying apparatus 17. Each of the first filter 401, the second filter 402, and the third filter 403 may include a pre-carbon filter, a membrane filter, and a post-carbon filter. Of course, the number and type of the filters 40 are not limited. For example, a plurality of functional filters having different types and capable of being accommodated in the water purifying apparatus 17 may be combined and applied to efficiently purify the water.

The filter 40 may have a cylindrical shape and be defined in outer appearance by the filter housing 41. The filter housing 41 may include a housing body 42 accommodating a filtering member configured to purify water therein and a housing cap 43 coupled to an open upper end of the housing body 42 to define an upper portion of the housing 41.

The housing cap 43 may be inserted into an opened bottom surface of the head 60. Also, a sealing member 44 may be provided at an upper end of the housing cap 43 and be in contact with an inner surface of the head 60 to prevent water from leaking.

When the filter 40 is mounted, a coupling groove 631 and a coupling protrusion 435 may be coupled to each other, and the filter 40 may be maintained in a state of being fixedly mounted on the head 60. Also, when the filter 40 and the head 60 are completely coupled to each other, flow paths of the filter 40 and the head 60 may be connected to each other so that water flows between the filter 40 and the head 60.

The head unit 50 may include a plurality of heads 60 to which the respective filters 40 are coupled, a mounting member 70 on which the head 60 is rotatably seated, a water inlet tube 301, through which raw water is introduced, and a water outlet tube 302, through which water is discharged. Here, the water inlet tube 301 and the water outlet tube 302 are connected to both ends of the mounting member 70.

The mounting member 70 is independently rotatable in a state in which the plurality of heads 60 are mounted. The plurality of heads 60 may be configured so that the flow paths are connected by a connection tube 71, and the raw water introduced through the inlet tube 301 may be purified after passing through each filter and then be discharged to the outlet tube 302. Also, a cover 72 may be mounted on one side of the mounting member 70 corresponding to the connection tube 71 to shield the connection tube 71.

The connection cover 72 may be fixedly mounted on the connection tube 71 to define a portion of an outer appearance of the mounting member 70. Also, the connection cover 72 may connect a flow path between the head 60 and the adjacent head 60, and the head 60 may be fixed so that the head 60 is maintained in the fixed state without being separated even in a rotation operation thereof.

The head 60 may include a head body 61 into which an upper end of the filter 40 is inserted to be fixed, a shaft (not shown) provided inside the head body 61 and connected to the upper end of the filter 40 to define a flow path through which water flows, and a head cap 62 configured to shield a top surface of the head body 61 into which the shaft is inserted.

The filter 40 may be fixedly mounted to the head 60 in a rotational manner, and the flow path may be connected to the inside of the head 60 while the filter 40 is mounted to supply water to be purified to the inside of the filter 40. The water purified in the filter 40 may be discharged to the head 60.

Also, when the filter 40 is separated, the flow path inside the head 60 is converted so that the flow path toward the filter 40 is blocked to prevent water from leaking and then is bypassed to pass through the head 60. That is, even though the filter 40 is removed when the filter 40 is moved due to a service work such as replacement of the filter 40 or cleaning of the flow path or user's intention, the water supplied through the water inlet tube 301 may flow to the water outlet tube 302 via the head 60. Thus, the supply of water to the entire water supply flow path 30 may be performed without interruption, and the dispenser 23 and the ice maker 24 may be used normally.

Only one filter 40 may be provided according to a function of the water purifying apparatus 17, and when only one filter 40 is provided, the head unit 50 may be also constituted by one head 60 and one mounting member 70. The heads 60 may have the same structure regardless of the number of heads 60. Hereinafter, a water purifying apparatus including a singular filter 40 and a singular head 60 will be described.

Figure 5:
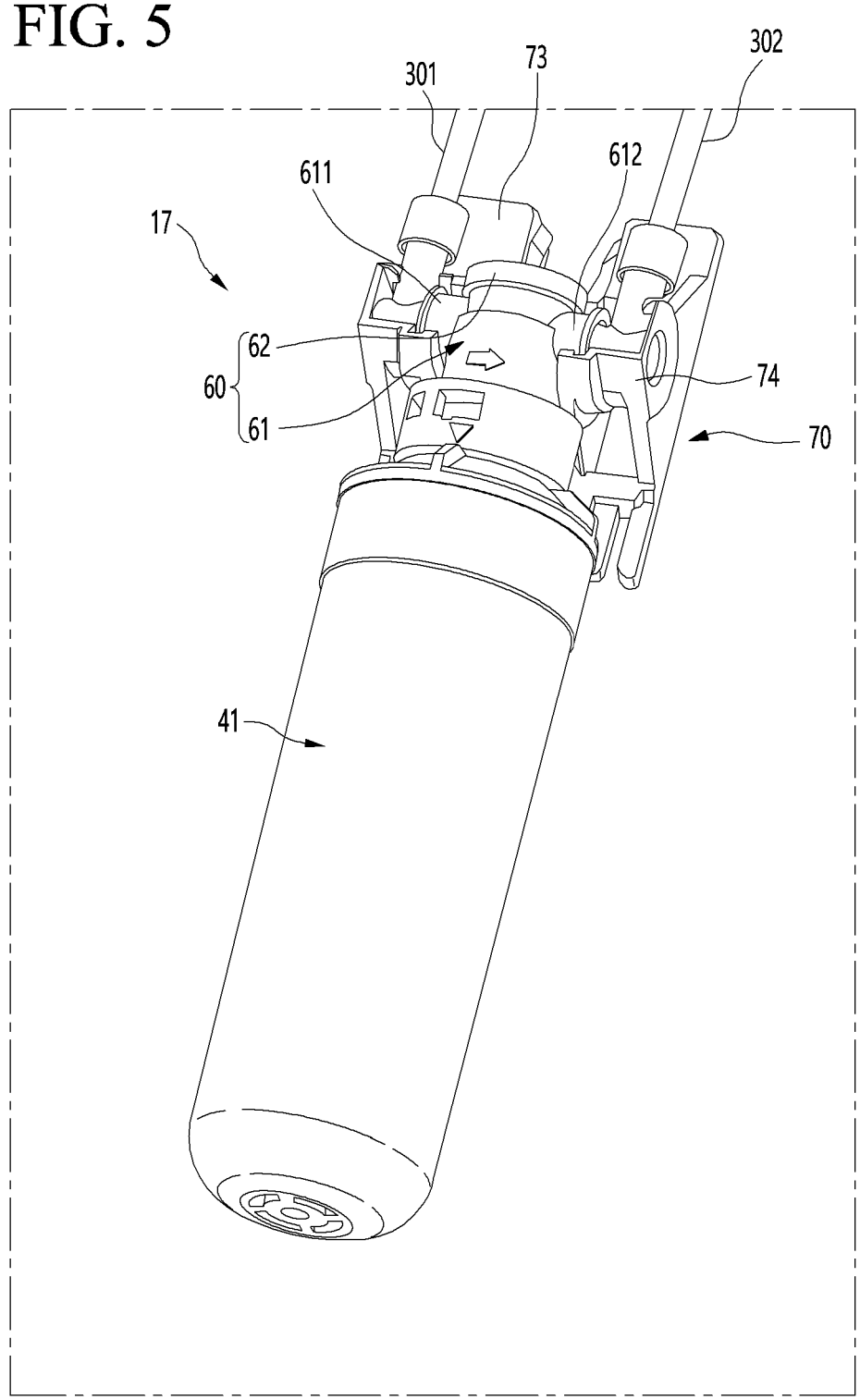
FIG. 5 is a perspective view illustrating a structure of a water purifying apparatus according to another embodiment.
Figure 6:
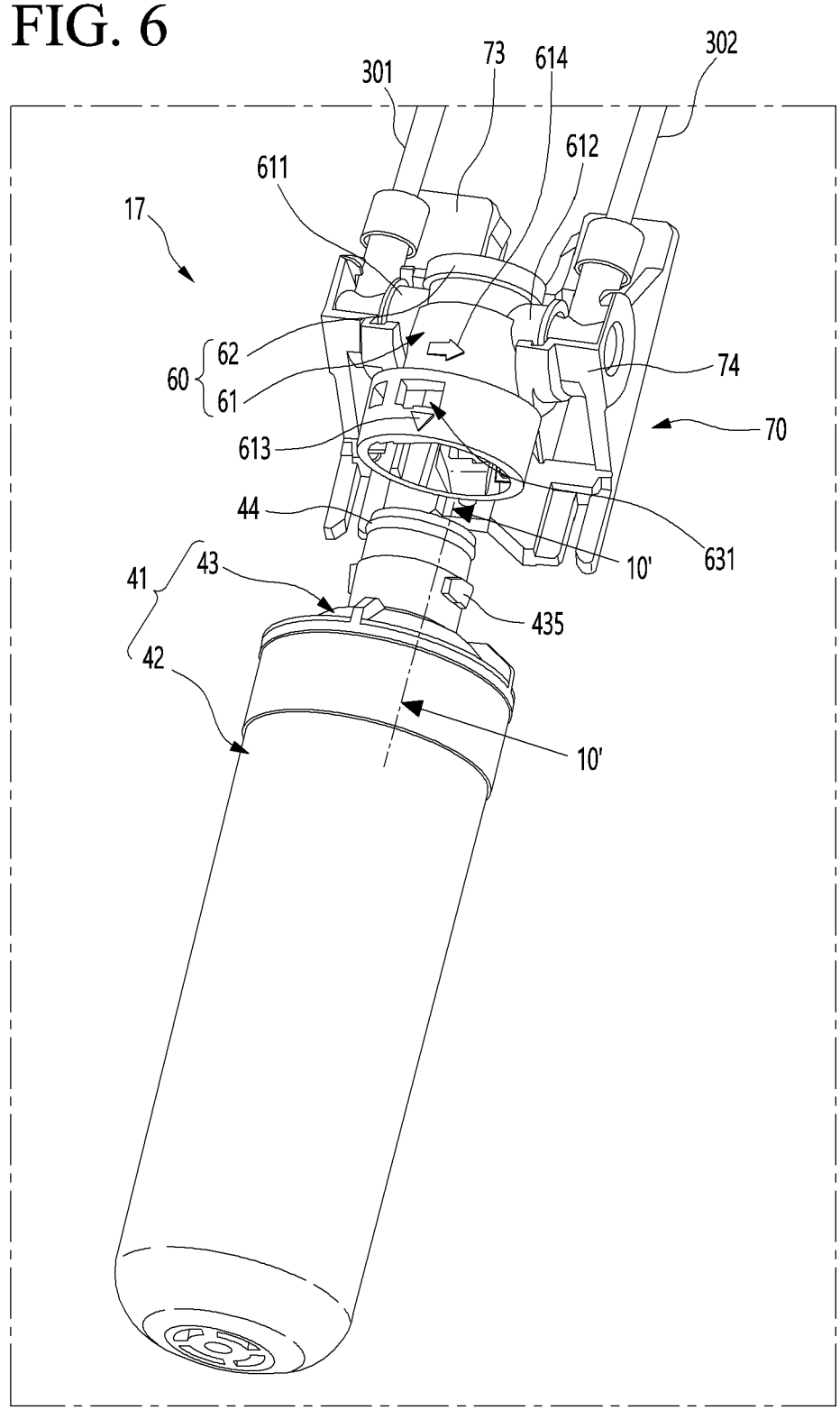
FIG. 6 is an exploded perspective view illustrating a state in which a filter and a head of the water purifying apparatus are separated from each other.

FIG. 5 is a perspective view illustrating a structure of the water purifying apparatus according to another embodiment. FIG. 6 is an exploded perspective view illustrating a state in which the filter and the head of the water purifying apparatus are separated from each other.

As illustrated in the drawings, the water purification apparatus 17 according to another embodiment of the present invention includes a filter 40, a head 60, and a mounting member 70.

The filter 40 may have a cylindrical shape and be defined in outer appearance by the filter housing 41. The filter housing 41 may include a housing body 42 accommodating a filtering member therein and a housing cap 43 coupled to an opened upper end of the housing body 42 to define an upper portion of the housing 41.

The housing body 42 is manufactured in a cylindrical shape so that a first accommodation space for accommodating the filtering member 45 is defined. The housing body 42 may have an upper opening.

The housing cap 43 may be coupled to the upper opening of the housing body 42.

The housing cap 43 may define a second accommodation space for accommodating a portion of the filtering member 45. For this, a portion of the housing cap 42 may have a cylindrical shape. Also, the housing cap 43 has an upper opening.

The housing cap 43 may be inserted into an opened bottom surface of the head 60. Also, a sealing member 44 may be provided at an upper end of the housing cap 43. The sealing member 44 may be in contact with an inner surface of the head 60 to prevent water from leaking.

Also, a coupling protrusion 435 may be further disposed on the upper portion of the housing cap 43. The coupling protrusion 435 may be inserted along a coupling groove 631 defined in the inner surface of the head 60 when the upper portion of the filter 40 is inserted into the head 60.

The mounting member 70 may include a base mounted on a wall surface of one side of the case 171 or the refrigerator and a rotation support portion 74 protruding from both sides of the base 73 to rotatably support both sides of the head 60. Also, ends of the water inlet tube 301 and the water outlet tube 302 may be disposed on the rotation support portion 74, and the water inlet tube 301 and the water outlet tube 302 in the rotation support portion 74 may be connected to a water inlet portion 611 and a water outlet portion 612 of the head 60, respectively.

The head 60 may be rotatably mounted on the mounting member 70 by the rotation support portion 74.

The head 60 may have a cylindrical shape with an open bottom surface and may include a head body into which the filter 40 is inserted to be fixed, a shaft 90 accommodated inside the head body 61, and a head cap 62 configured to shield an opened top surface of the head body 61.

Also, an insertion display portion 613 that indicates an inserted position of the coupling protrusion 435 may be disposed on an outer surface of the head body 61, and the user may recognize a position of the coupling groove 631 to facilitate alignment with the coupling protrusion 435.

Also, a rotation display portion 614 indicating a rotation direction of the filter 40 may be disposed on an outer surface of the head body 61. The user may manipulate the rotation of the filter 40 in the correct direction so that the coupling protrusion 435 moves along an inside of the coupling groove 631 so as to be coupled.

Figure 7:
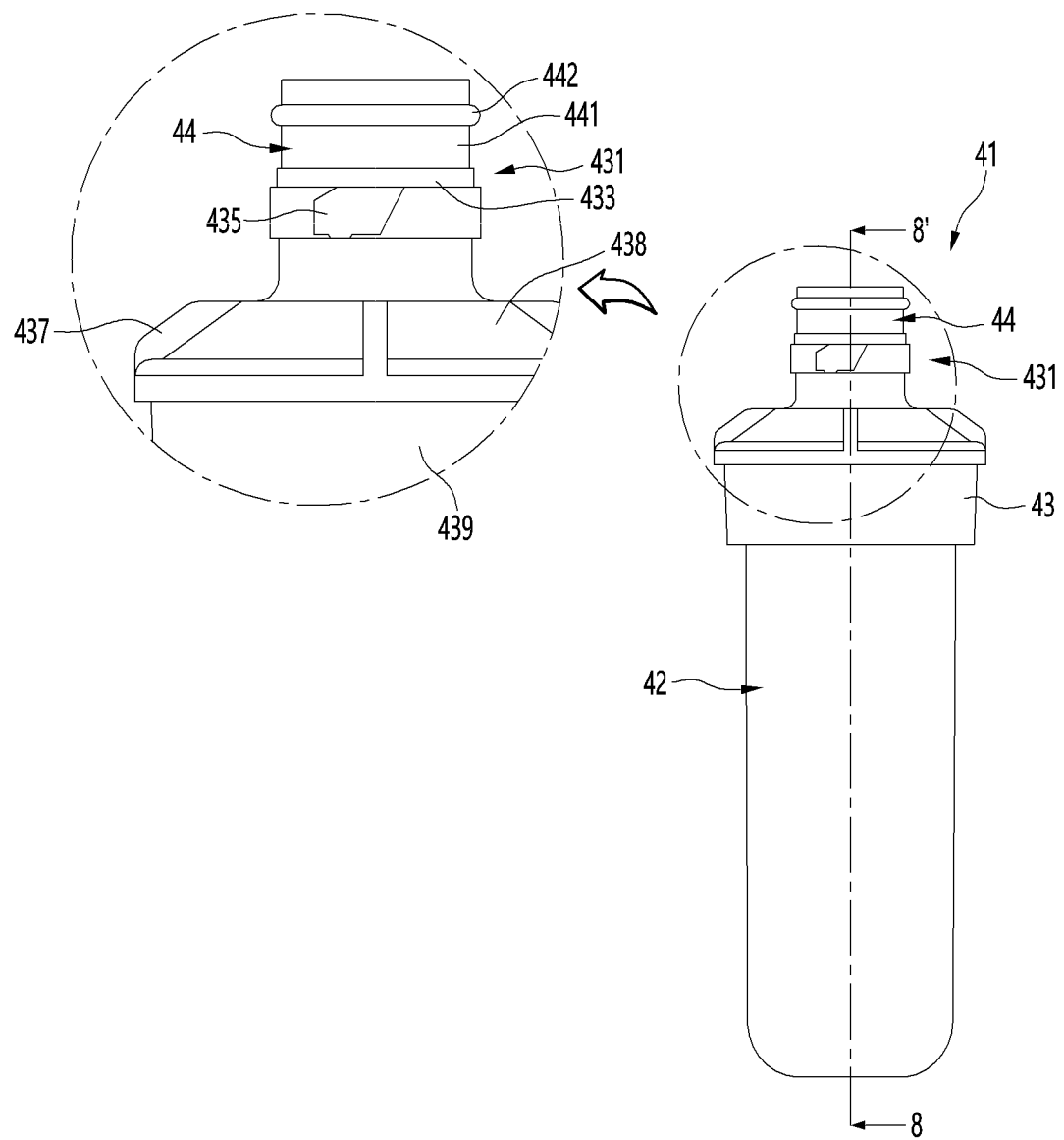
FIG. 7 is a front view illustrating a structure of a filter housing.
Figure 8:
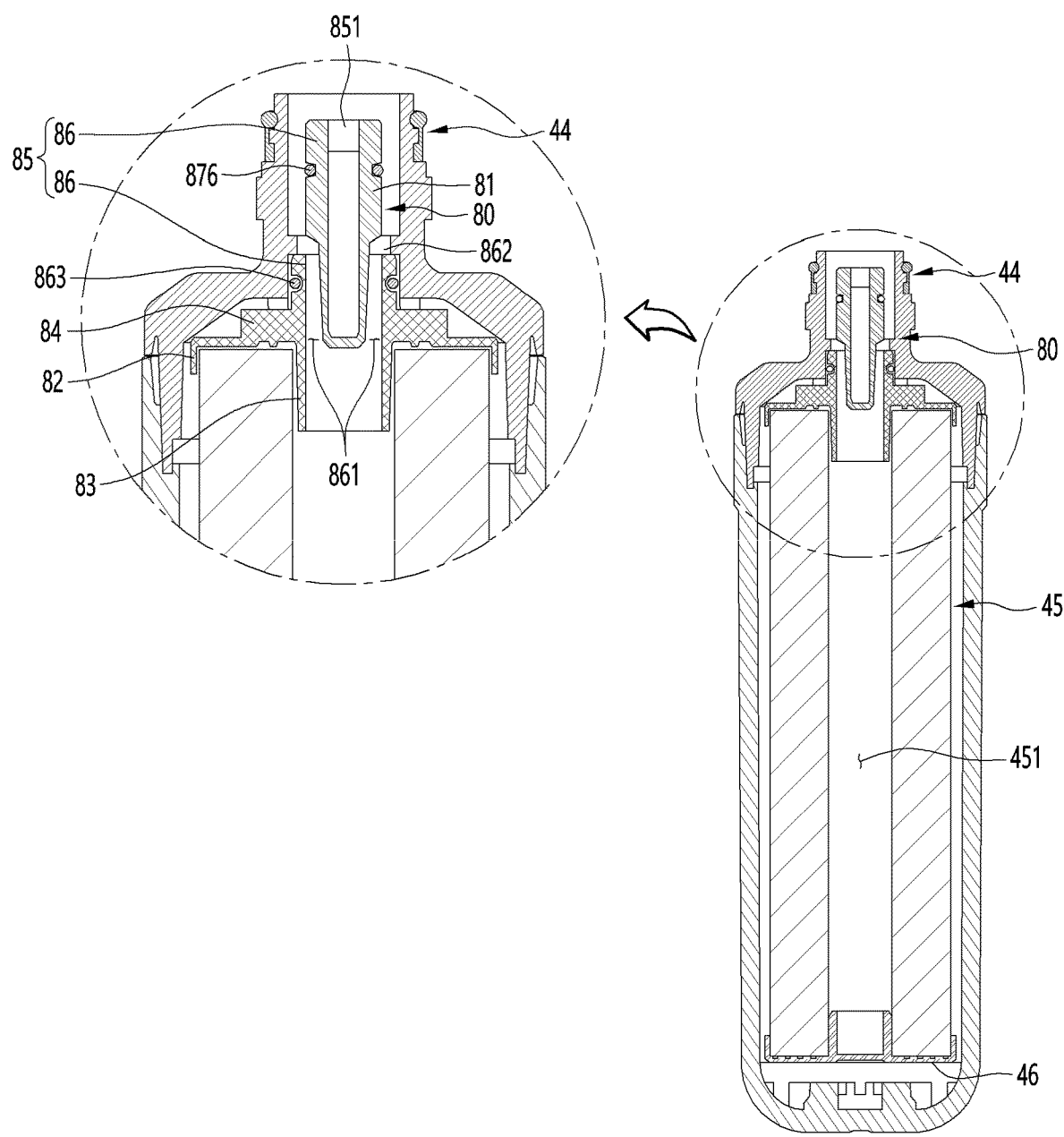
FIG. 8 is a cross-sectional view taken along line 8-8' of FIG. 7.

FIG. 7 is a front view illustrating a structure of the filter housing. Also, FIG. 8 is a cross-sectional view taken along line 8-8' of FIG. 7.

Next, a structure of the filter housing according to an embodiment will be described in detail.

The filter 40 may be fixedly mounted on the head 60 by rotating in a horizontal direction. The filter may be inserted into an opened bottom surface of the head and be restricted by the head while rotating in a direction crossing the insertion direction of the head and then maintained in the fixed state. Also, the shaft may be connected to the filter 40 while the filter 40 is mounted to define a flow path. When the filter 40 rotates, the shaft may rotate together with the filter 40 to convert a flow path.

That is, in the state in which the filter 40 is mounted by the shaft, the flow path toward the filter 40 may be converted so that the water is purified by passing through the filter 40. Also, In a state in which the filter 40 is separated, the flow path may be converted so that the supplied water is bypassed without passing through the filter 40 to pass through the head 60.

The filter may include the filter housing 41 defining an outer appearance and a filtering member 45 provided inside the filter housing 41.

The filter housing 41 may have a cylindrical shape and include a housing body 42 accommodating the filtering member therein and a housing cap 43 coupled to an opened upper end of the housing body 42 to define an upper portion of the housing 41.

The housing body 42 may be manufactured in a cylindrical shape so that a space for accommodating the filtering member 45 is defined. Also, the housing body 42 may have an upper opening.

The filtering member 45 may have a cylindrical shape in which a hollow 451 is defined in a vertical direction at a center thereof, and an upper supporter 80 and a lower supporter 46 may be respectively coupled to upper and lower ends of the filtering member 45 so that the filtering member 45 is fixedly mounted inside the filter housing 41.

The upper supporter 80 may be provided on the upper end of the filtering member 45 and extend upward to define a flow path connecting an inlet of the head insertion portion 431 to the hollow 451. Thus, water supplied from the head 60 may be introduced through the head insertion portion 431, and the water purified by the filter 40 may be discharged to the head 60.

The upper supporter 80 may include a supporter accommodation portion 82 that accommodates the upper end of the filtering member 45, a supporter insertion portion 83 extending downward from a central portion of the supporter accommodation portion 82 and inserted into the hollow 451 of the filtering member 45, a supporter stepped portion 84 protruding upward from a top surface of the supporter insertion portion 83 so as to be stepped, and a supporter extension portion 85 extending to be inserted from a center of a top surface of the supporter stepped portion 84 to the inside of the head insertion portion 431.

The supporter insertion portion 83 may have a hollow and communicate with a filter outlet flow path 861 provided in the supporter extension portion 85.

The supporter stepped portion 84 may protrude from the top surface of the supporter accommodation portion 82 and may have a diameter less than that of the supporter accommodation portion 82.

The supporter extension portion 85 extending upward may be disposed at a center of the supporter stepped portion 84. The supporter extension portion 85 is disposed inside the head insertion portion 431 when the housing cap 43 and the upper supporter 80 are coupled to each other.

The supporter extension portion 85 is constituted by a first extension portion 86 extending from the supporter stepped portion 84 and a second extension portion 87 extending upward from the first extension portion 86. The first extension portion 86 may have an outer diameter greater than that of the second extension portion 87, and a filter outlet 862 may be provided in a top surface of the first extension portion 86.

A first extension portion O-ring 863 may be provided outside the first extension portion 86, and a second extension portion O-ring 876 may be provided outside the second extension portion 87. A space between the inside of the head insertion portion 431 and the first extension portion 86 may be sealed by the first extension portion O-ring 863. Also, the second extension portion O-ring 876 is in close contact with an inner surface of the shaft 90 so that a space between the second extension portion 87 and the shaft (not shown) is sealed.

Thus, water introduced into the supporter extension portion 85 and purified water discharged to the outside of the supporter extension portion 85 may flow through an independent flow path without leaking or mixed with each other.

A first connection portion 851 may be disposed on an upper end of the supporter extension portion 85. The first connection portion 851 may be provided to be recessed inward from the upper end of the supporter extension portion 85 and may be symmetrical to both left and right sides. The first connection portion 851 may be inserted into the shaft to rotate.

The head insertion portion 431 may have a hollow therein, and a housing coupling portion 430 to be coupled to the upper supporter 80 may protrude from an inner surface of the head insertion portion 431.

The housing cap 43 may be coupled to the upper opening of the housing body 42.

Next, the housing cap 43 and the sealing member 44 according to an embodiment will be described in detail.

Figure 9:
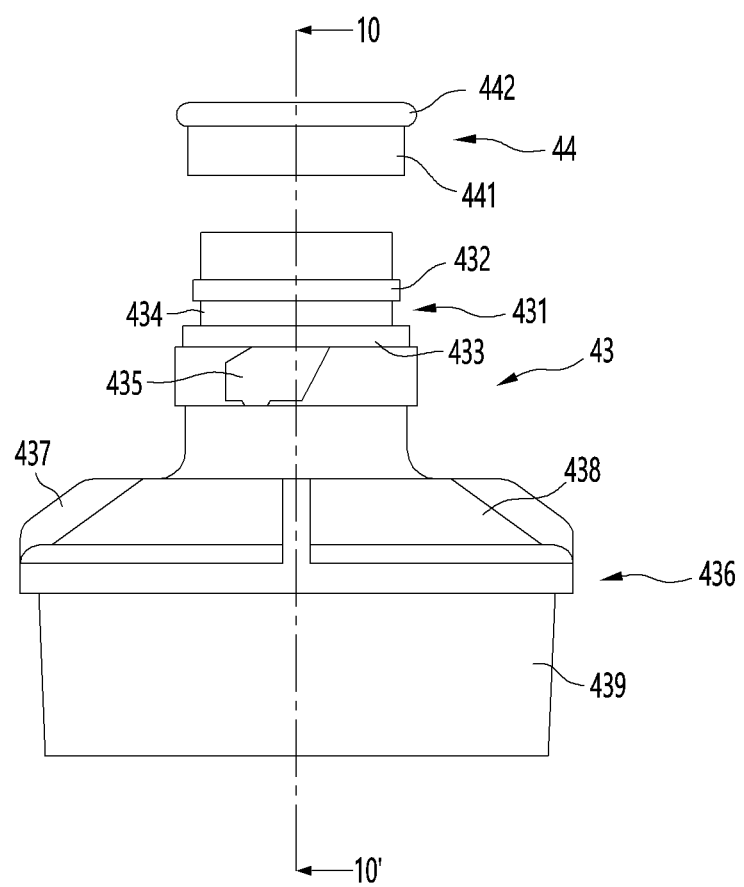
FIG. 9 is a front view illustrating a housing cap and a sealing member according to an embodiment.
Figure 10:
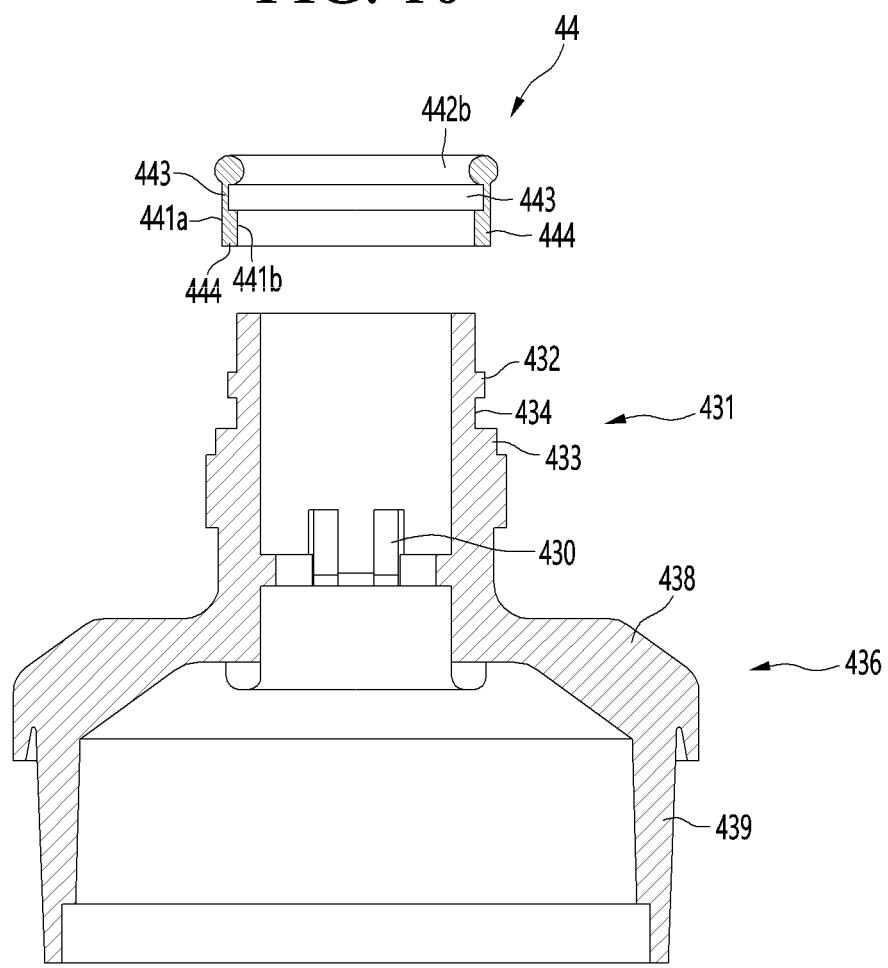
FIG. 10 is a cross-sectional view taken along line 10-10' of FIG. 9.

FIG. 9 is a front view illustrating the housing cap and the sealing member according to an embodiment. Also, FIG. 10 is a cross-sectional view taken along line 10-10' of FIG. 9.

The housing cap 43 may be inserted into an opened bottom surface of the head 60. Also, the sealing member 44 may be provided on an upper portion of the housing cap 43, and the sealing member 44 may be in contact with an inner surface of the head body 61. Thus, the flow path may be converted toward the filter 40 by rotation of the shaft so that water introduced into and discharged from the filter 40 does not leak between the filter 40 and the head 60.

A head insertion portion 431 inserted into the head 60 and coupled to the head 60 may be provided in an upper end of the housing cap 43.

The head insertion portion 431 may include a fixing portion 432 to fix a sealing member 44 to be described later. The fixing portion 432 may prevent the sealing member 44 from being separated or damaged and may protrude outward along an outer surface of the head insertion portion 431.

Also, the fixing portion 432 may be spaced a predetermined distance from an upper end of the head insertion portion 431 and may be provided singly on the outer surface of the head insertion portion 431.

That is, when the housing cap 43 is injection-molded by simplifying the structure required to fix the sealing member 44 as much as possible, an occurrence of an undercut formed in a direction crossing a longitudinal direction of the filter housing 41 may be reduced.

Also, the head insertion portion 431 may further include a support portion 433 supporting the sealing member 44 from a lower side.

The support portion 433 may be disposed below the fixing portion 432 to protrude outward along the outer surface of the head insertion portion 431. Also, a lower end of the sealing member 44 may be seated on the upper end of the support portion 433 to prevent the sealing member 44 from being separated from the head insertion portion 431.

The support portion 433 may have a distance protruding from the outer surface of the head insertion portion 431, which corresponds to a thickness of the sealing member 44 or greater than that of the sealing member 44 in a horizontal direction of the sealing member 44. Also, the support portion 433 may protrude longer than a distance by which the fixing portion 432 protrudes from the outer surface of the head insertion portion 431.

Also, the fixing portion 432 and the support portion 433 may be connected to each other by an insertion connection portion 434.

The insertion connection portion 434 may be recessed further inward than the fixing portion 432 and the support portion 433 to provide a surface that is in contact with a hook portion 444 of the sealing member 44, which will be described later. Thus, the sealing member 44 may be fixed so as not to be separated from the head insertion portion 431.

The fixing portion 432, the insertion connection portion 434, and the support portion 433 may be disposed to be stepped with respect to each other. Particularly, the fixing portion 432 may protrude further outward from the head insertion portion 431 than the insertion connection portion 434. Also, the support portion 433 may protrude further outside the head insertion portion 431 than the fixing portion 432. Due to this structure, the sealing member 44 may be firmly fixed and mounted on the outer surface of the head insertion portion 431.

Also, the structure of the head insertion portion 431 of the housing cap 43 may be simplified to improve production by removing the occurrence of the undercut during the injection molding and maximally prevent burr from occurring. Also, when the housing cap 43 is inserted into the head 60, a point at which water leakage occurs due to the occurrence of the burr may be removed.

A coupling protrusion 435 may be disposed outside the head insertion portion 431. A pair of coupling protrusions 435 may be disposed at positions opposite to each other and may be inserted into the coupling groove 631 and mounted on the head 60.

The housing cap 43 includes a body connection portion 436 extending downward from the head insertion portion 431 and coupled to the housing body 42.

An upper end of the body connection portion 436 may include an inclined surface 438 connected to a lower end of the head insertion portion 431 and having a structure that is inclined downward in a direction away from a center of the housing cap 43. That is, the inclined surface 438 of the body connection portion 436 may have a shape of which a diameter increases from the top to the bottom.

The inclined surface 438 may further include an inclined rib 437 protruding upward from the inclined surface 438. The inclined rib 437 may extend from an upper end to a lower end of the inclined surface 438 and may be spaced apart along the inclined surface 438 and provided in plurality. The inclined rib 437 may further firm strength of the filter housing 41.

Also, the body connection portion 436 may include an extension surface 439 extending downward from the lower of the inclined surface 438, and a portion of the filtering member 45 may be inserted into the extension surface 439.

The sealing member 44 that is in close contact with a circumference of an outer surface of the head insertion portion 431 along the circumference of the outer surface of the head insertion portion 431 to seal a gap between the head insertion portion 431 and the inner surface of the head 60.

The sealing member 44 may have opened top and bottom surfaces and be inserted into the head insertion portion 431 from above to surround an outer surface of the head insertion portion 431. The sealing member 44 may be in contact with the inner surface of the head body when the filter is mounted so that water introduced into or discharged to the filter does not leak between the heads 60.

The sealing member 44 may include a first sealing portion 441 disposed along a circumference of the outer surface of the head insertion portion 431 to surround the head insertion portion 431 and a second sealing portion protruding outward along a circumference of an upper end of the first sealing portion 441.

The first sealing portion 441 may extend from an upper end of the fixing portion 432 up to an upper end of the support portion 433. The first sealing portion 441 may surround an area of a corresponding portion of the head insertion portion 431 to increase in area to be sealed between the insertion portion 431 and the head 60. Thus, when the housing cap 43 is inserted into the head 60, the leakage of the water introduced into and discharged from the housing cap 43 may be effectively prevented.

The first sealing portion 441 is disposed below the fixing portion and include a hook portion 444 disposed along an outer surface of the filter housing and a connection portion 443 connecting the second sealing portion 442 to the hook portion 444.

In detail, an outer surface 441a of the first sealing portion 441 may be provided as a surface that extends upward from a lower end of the sealing member 44 so as to be in contact with the head 60 when the head insertion portion 431 is inserted into the head 60.

An inner surface 441b of the first sealing portion 441 includes a connection portion 443 including an inner groove recessed in a shape corresponding to the fixing portion 432. The connection portion 443 may be in close contact with the fixing portion 432 when the sealing member 44 is mounted on the head insertion portion 431 so that the sealing member 44 is fixed to the head insertion portion 431.

The connection portion 443 may extend downward from an upper end of the first sealing portion 441. Also, the inner groove may be defined at a position corresponding to the fixing portion 432 and may be in close contact with the fixing portion 432.

Also, the inner surface 441b of the first sealing portion 441 may include a hook portion 444 extending downward from a lower end of the inner groove 443 and connected to an upper end of the support portion 433. That is, in the hook portion 444, an upper end of the hook portion 444 is connected to the inner groove 443, and a lower end of the hook portion 444 defines a lower end of the sealing member 44.

The connection portion 443 and the inner surface of the hook portion 444 may be provided to be stepped. That is, a thickness of the hook portion 444 in the horizontal direction based on the lower end of the sealing member 44 may be greater than a thickness of the connection portion 443 in the horizontal direction.

The connection portion 443 is in contact with the fixing portion 432 so that the sealing member 44 is fixed to be in contact with the head insertion portion 431. Also, the hook portion 444 may match the insertion connection portion 434 of the head insertion portion 431.

The second sealing portion 442 may protrude outward from the upper end of the first sealing portion 441 along a circumference of the first sealing portion 441.

When the second sealing portion 442 is in contact with the upper end of the fixing portion 432 when mounted on the head insertion portion 431. Thus, when the housing cap 43 is connected to the head 60, water introduced int and discharged from the housing cap 43 does not leak between the housing cap 43 and the head 60.

In detail, the lower end of the second sealing portion 442 may be provided at a position that is in contact with the upper end of the fixing portion 432. Also, the upper end of the second sealing portion 442 may be positioned below the upper end of the head insertion portion 431. That is, the second sealing portion 442 may be disposed between the upper end of the head insertion portion 431 and the fixing portion 432.

An outer surface of the second sealing portion 442 may protrude outward from the head insertion portion 431 (a direction away from the center of the head insertion portion 431). Thus, when the head is inserted into the housing cap 43, the outer surface of the second sealing portion 442 may be in contact with the inner surface of the head 60 to seal a gap between the housing cap 43 and the head 60.

Also, both side ends of the second sealing portion 442 may protrude further outward from the head insertion portion 431 than both side ends of the connection portion 434. That is, when the filter housing 41 is inserted into the head 60, the second sealing portion 442 seals the gap between the head 60 and the filter housing 41 to prevent water from leaking.

Also, the inner surface 442b of the second sealing portion may protrude to the inside of the second sealing portion 442 (a direction closer to the center of the head insertion portion 431), and thus, when the sealing member 44 is mounted on the head insertion portion 431, the inner surface 442b of the second sealing portion may be in close contact with the head insertion portion 431.

As described above, a cross-section of the second sealing portion 442 may have a circular O-ring shape. Also, an outer end of the second sealing portion 442 may be in line contact with the head 60 to prevent the sealing member 44 from being separated from the head insertion portion 431 by the rotation operation of the filter 40. That is, the sealing member 44 may be linearly bonded to the inner surface of the head 60. As a result, the sealing member 44 may restrict vertical movement of the sealing member 44 due to the rotation operation of the filter 40.

That is, according to a sealing member 44 according to another embodiment, the sealing member 44 may include a sealing portion 442 disposed above the fixing portion 432 and protruding outward along a circumference of the filter housing, a hook portion 444 disposed below the fixing portion 432 and disposed along an outer surface of the filter housing, and a connection portion 443 connecting the sealing portion 442 to the hook portion 444. That is, the first sealing portion 441 may include the connection portion 443 and the hook portion 444, and the second sealing portion 442 may include the sealing portion.

As described above, the sealing member 44 according to an embodiment may be in surface contact with the head insertion portion 431, and thus, when the housing cap 43 is inserted into the head 60, an area to be sealed between the head 60 and the housing cap 43 may more increase.

Also, the structure of the head insertion portion 431 of the housing cap 43 may be simplified to prevent the undercut from occurring during the injection molding, and the head insertion portion 431 may be manufactured using a relatively simple mold to reduce an occurrence of burr due to distortion of the mold. Therefore, the leakage of water between the head 60 and the housing cap 43 may be effectively prevented.

Figure 11:
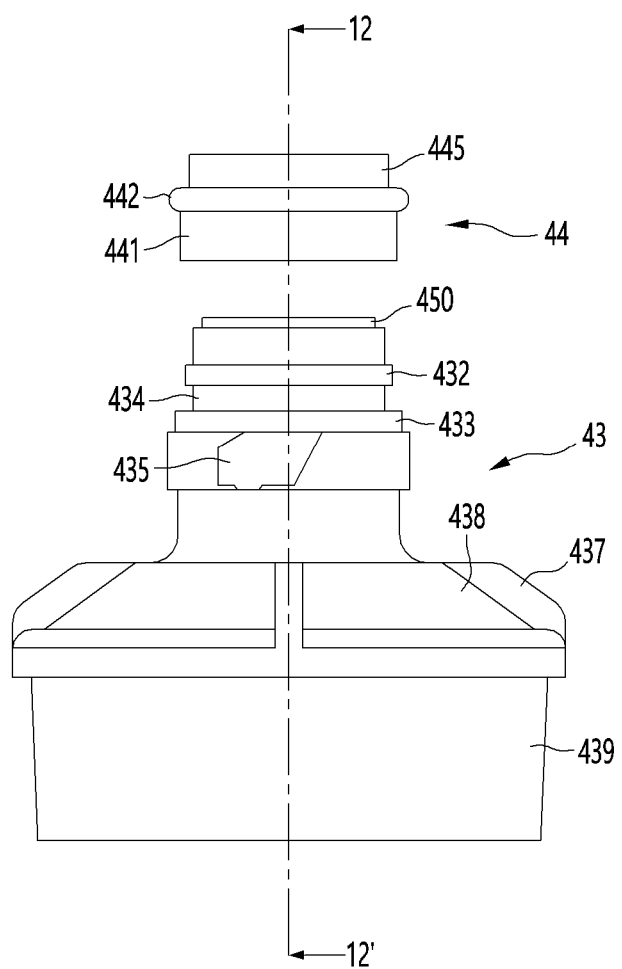
FIG. 11 is a front view of a housing cap and a sealing member according to another embodiment.
Figure 12:
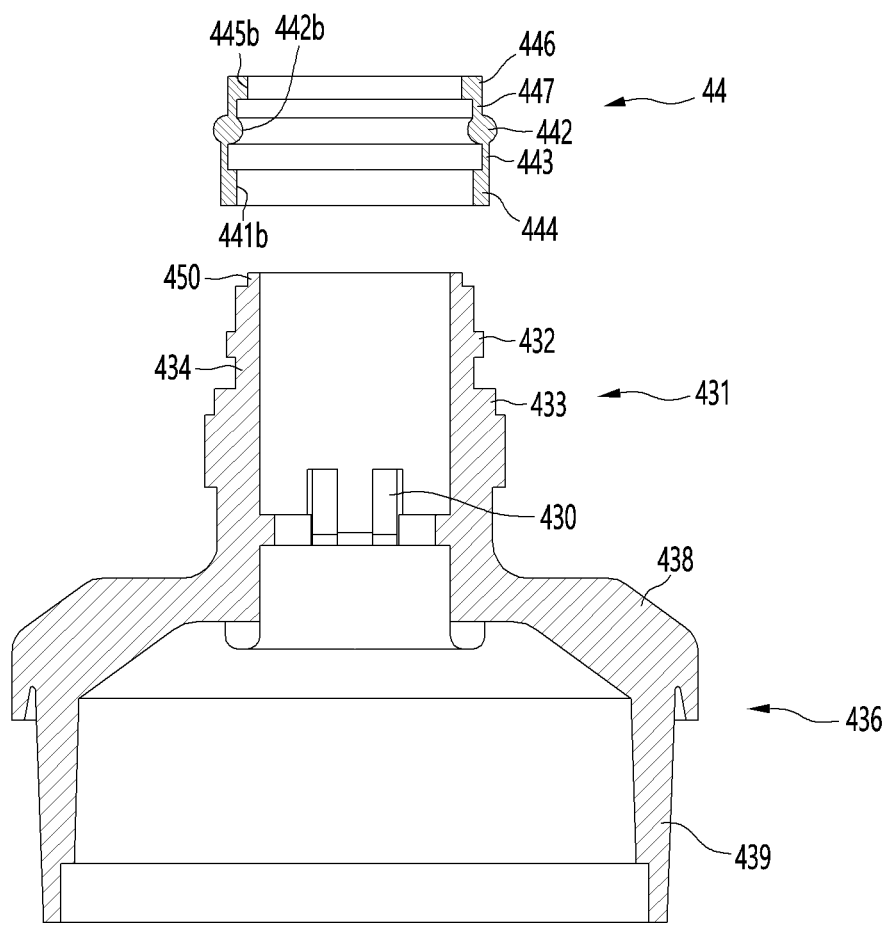
FIG. 12 is a cross-sectional view taken along line 12-12' of FIG. 11.
Figure 13:
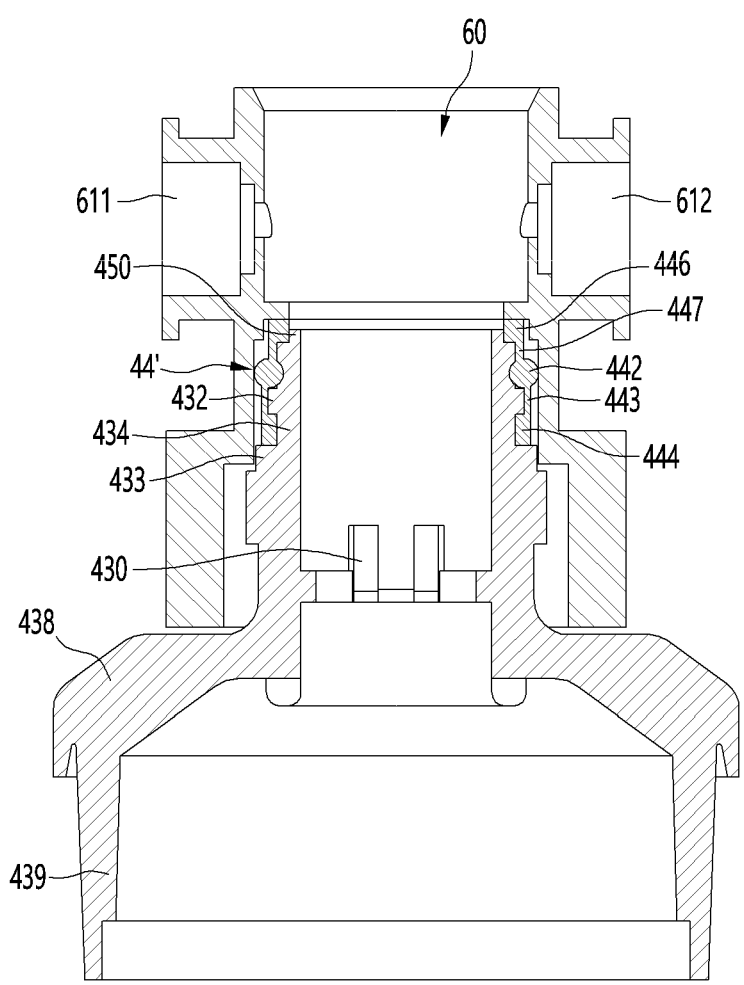
FIG. 13 is a cross-sectional view illustrating a state in which the sealing member and the housing cap are mounted on a head according to another embodiment.

FIG. 11 is a front view of a housing cap and a sealing member according to another embodiment. Also, FIG. 12 is a cross-sectional view taken along line 12-12' of FIG. 11. Also, FIG. 13 is a cross-sectional view illustrating a state in which the sealing member and the housing cap are mounted on a head according to another embodiment.

A head insertion portion 431 inserted into the head 60 and coupled to the head 60 may be provided in an upper end of the housing cap 43.

The head insertion portion 431 may further include a protrusion portion 450 extending upward along a circumference of an upper end of the head insertion portion 431. The protrusion portion 450 serves to fix an extension portion 445 constituting a sealing member 44', which will be described later, to an upper end thereof.

The protrusion portion 450 may be stepped with respect to the upper end of the head insertion portion 431. In detail, the protrusion portion 450 may protrude upward from the inside of the head insertion portion 431. Also, an outer diameter of the protrusion portion 450 may be less than an outer diameter of the head insertion portion 431. Also, the outer diameter of the protrusion portion 450 may be equal to or less than an inner diameter of an opened upper surface of the head insertion portion 431.

When the sealing member 44' is mounted on the head insertion portion 431, the protrusion portion 450 may allow the sealing member 44' to be hooked and fixed to an upper end of the sealing member 44', thereby preventing the sealing member 44' from being separated from the head insertion portion 431.

Also, the head insertion portion 431 may include a fixing portion 432 to fix the sealing member 44'.

The fixing portion 432 may protrude outward along an outer surface of the head insertion portion 431. Also, the fixing portion 432 may be spaced a predetermined distance from an upper end of the head insertion portion 431 and may be provided singly on the outer surface of the head insertion portion 431.

That is, when the housing cap 43 is injection-molded by simplifying the structure required to fix the sealing member 44' as much as possible, an occurrence of an undercut formed in a direction crossing a longitudinal direction of the filter housing 41 may be reduced.

Also, the head insertion portion 431 may further include a support portion 433 supporting the sealing member 44' from a lower side.

The support portion 433 may be disposed below the fixing portion 432 to protrude outward along the outer surface of the head insertion portion 431. Also, a lower end of the sealing member 44' may be seated on the upper end of the support portion 433 to prevent the sealing member 44' from being separated from the head insertion portion 431.

The support portion 433 may have a distance protruding from the outer surface of the head insertion portion 431, which corresponds to a thickness of the sealing member 44' or greater than that of the sealing member 44' in a horizontal direction of the sealing member 44'. Also, the support portion 433 may protrude longer than a distance by which the fixing portion 432 protrudes from the outer surface of the head insertion portion 431.

Also, a coupling protrusion 435 may be disposed outside the head insertion portion 431. A pair of coupling protrusions 435 may be disposed at positions opposite to each other and may be inserted into a coupling groove and mounted on the head 60.

The housing cap 43 includes a body connection portion 436 extending downward from the head insertion portion 431 and coupled to the housing body 42.

An upper end of the body connection portion 436 may include an inclined surface 438 connected to a lower end of the head insertion portion 431 and having a structure that is inclined downward in a direction away from a center of the housing cap 43. That is, the inclined surface 438 of the body connection portion 436 may have a shape of which a diameter increases from the top to the bottom.

The inclined surface 438 may further include an inclined rib 437 protruding upward from the inclined surface 438. The inclined rib 437 may extend from an upper end to a lower end of the inclined surface 438 and may be spaced apart along the inclined surface 438 and provided in plurality. The inclined rib 437 may further firm strength of the filter housing.

Also, the body connection portion 436 may include an extension surface 439 extending downward from the lower of the inclined surface 438, and a portion of the filtering member 45 may be inserted into the extension surface 439.

The sealing member 44' that is in close contact with a circumference of an outer surface of the head insertion portion 431 along the circumference of the outer surface of the head insertion portion 431 to seal a gap between the head insertion portion 431 and the inner surface of the head 60.

The sealing member 44' may have opened top and bottom surfaces and be inserted into the head insertion portion 431 from above to surround an outer surface of the head insertion portion 431.

The sealing member 44' may include a first sealing portion 441 disposed along a circumference of the outer surface of the head insertion portion 431 to surround the head insertion portion 431, a second sealing portion 442 protruding outward along a circumference of an upper end of the first sealing portion 441, and an extension portion 445 extending upward from an upper end of the second sealing portion 442.

The first sealing portion 441 may extend from an upper end of the fixing portion 432 up to an upper end of the support portion 433. The first sealing portion 441 may surround an area of a corresponding portion of the head insertion portion 431 to increase in area to be sealed between the insertion portion 431 and the head 60. Thus, when the housing cap 43 is inserted into the head 60, the leakage of the water introduced into and discharged from the housing cap 43 may be effectively prevented.

In detail, an outer surface of the first sealing portion 441 may be provided as a surface that extends upward from a lower end of the sealing member 44' so as to be in contact with the head 60 when the head insertion portion 431 is inserted into the head 60.

An inner surface of the first sealing portion may include a connection portion 443 including an inner groove recessed in a shape corresponding to the fixing portion 432. The inner groove 443 may be in close contact with the fixing portion 432 when the sealing member 44' is mounted on the head insertion portion 431 so that the sealing member 44 is fixed to the head insertion portion 431.

The inner groove 443 may extend downward from an upper end of the first sealing portion 441. Also, the inner groove 443 may be defined at a position corresponding to the fixing portion 432 and may be in close contact with the fixing portion 432.

Also, the inner surface of the first sealing portion 441 may include a hook portion 444 extending downward from a lower end of the connection portion 443 and connected to an upper end of the support portion 433. That is, in the hook portion 444, an upper end of the hook portion 444 is connected to the inner groove 443, and a lower end of the hook portion 444 defines a lower end of the sealing member 44'.

The inner groove 443 and the hook portion 444 may be stepped with respect to each other. That is, in the first sealing portion 441, a length of an upper portion of the first sealing portion 441 in the horizontal direction is less than a length of a lower portion of the first sealing portion 441 in the horizontal direction. The inner groove 443 is in contact with the fixing portion 432 so that the sealing member 44 is fixed to be in contact with the head insertion portion 431. Also, the hook portion 444 may be in contact with the fixing portion 432 and the support portion 433 of the head insertion portion 431.

The second sealing portion 442 may protrude outward from the upper end of the first sealing portion 441 along a circumference of the first sealing portion 441.

When the second sealing portion 442 is in contact with the upper end of the fixing portion 432 when mounted on the head insertion portion 431. Thus, when the housing cap 43 is connected to the head 60, water introduced int and discharged from the housing cap 43 does not leak between the housing cap 43 and the head 60.

In detail, the lower end of the second sealing portion 442 may be provided at a position that is in contact with the upper end of the fixing portion 432. Also, the upper end of the second sealing portion 442 may be positioned below the upper end of the head insertion portion 431. That is, the second sealing portion 442 may be disposed between the upper end of the head insertion portion 431 and the fixing portion 432.

An outer surface of the second sealing portion 442 may protrude outward from the head insertion portion 431 (a direction away from the center of the head insertion portion 431). Thus, when the head is inserted into the housing cap 43, the outer surface of the second sealing portion 442 may be in contact with the inner surface of the head 60 to seal a gap between the housing cap 43 and the head 60.

Also, the inner surface of the second sealing portion 442 may protrude to the inside of the second sealing portion 442 (a direction closer to the center of the head insertion portion 431), and thus, when the sealing member 44 is mounted on the head insertion portion 431, the inner surface 442b of the second sealing portion may be in close contact with the head insertion portion 431.

The extension portion 445 may extend from an upper end of the second sealing portion 442 so that the sealing member 44' surrounds an upper end of the head insertion portion 431.

When the housing cap 43 is inserted into the head 60, the extension portion 445 may additionally seal the gap between the upper end of the housing cap 43 and the head 60. Thus, the extension portion 445 may be mounted on an upper portion of the head insertion portion 431 to effectively prevent water from leaking between the head 60 and the housing cap 43.

The extension portion 445 may extend from an upper end of the sealing portion 442 up to an upper end of the head insertion portion 431.

The upper end of the extension portion 445 may extend more upward than the upper end of the head insertion portion 431. As a result, when the housing cap 43 is inserted into the head 60, a space between the top surface of the housing cap 43 and the inside of the head 60 may be sealed.

That is, the sealing member 44' may further include an extension portion 445 to maximize an area to be sealed between the housing cap 43 and the head 60.

The inner surface 445b of the extension portion may have a shape that matches the upper portion of the head insertion portion 431. That is, the inner surface of the extension portion 445 may be disposed with the upper end and the lower end, which are stepped with respect to each other, therebetween.

In detail, the inner surface 445b of the extension portion may include a first extension portion 446 protruding in a direction closer to a center of the head insertion portion 431 at a position corresponding to the protrusion portion 450 and a second extension portion 447 extending downward from a lower end of the first extension portion 446 and connected to the second sealing portion 442.

The first extension portion 446 may have a shape corresponding to the shape of the protrusion part 450, and the sealing member 44' may be in close contact with the protrusion portion 450 to prevent the sealing member 44' from being separated from the head insertion portion 431.

The second extension portion 447 has an upper end connected to a lower end of the first extension portion 446 and a lower end connected to an upper end of the second sealing portion 442. Also, the second extension portion 447 may have a length less than a length of the first extension portion 446 in the horizontal direction.

That is, according to a sealing member 44 according to another embodiment, the sealing member 44 may include a sealing portion 442 disposed above the fixing portion 432 and protruding outward along a circumference of the filter housing, a hook portion 444 disposed below the fixing portion 432 and disposed along an outer surface of the filter housing, a connection portion 443 connecting the sealing portion 442 to the hook portion 444, and an extension portion 445 extending from an upper end of the sealing portion 442 so that the sealing member 44' surrounds the upper end of the head insertion portion 431.

As described above, in the housing cap 43 according to an embodiment, the head insertion portion 431 may have a simple structure to reduce an occurrence of the undercut and the burrs during the injection molding process.

Also, the sealing member 44 according to an embodiment has a wide surface that is in contact with the head insertion portion 431. Thus, when the housing cap 43 is inserted into the head 60, a point at which water leaks between the head 60 and the housing cap 43 may be reduced to effectively prevent the water from leaking.

Figure 14:
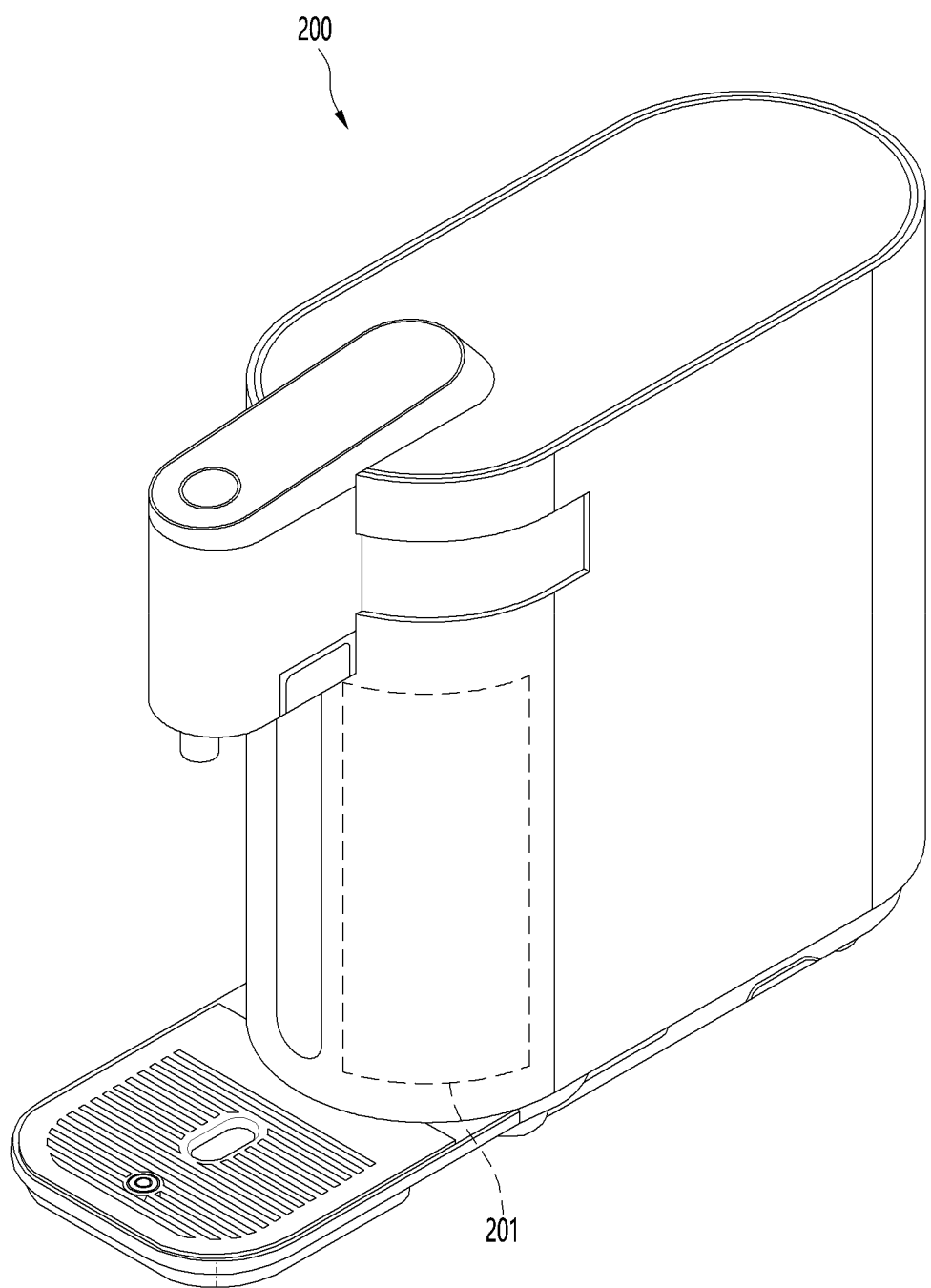
FIG. 14 is a front view of a water purifier in which a water purifying apparatus is mounted according to an embodiment.

In the foregoing embodiment, for convenience and understanding of the description, the water purifying apparatus 17 is mounted on the refrigerator 1 as an example, but as illustrated in FIG. 14, a water purifying apparatus 201 may be applied to all apparatuses that are capable of purifying water in a filter exchange manner, in addition to the purifier 200 that is used generally.

The water purifying apparatus and the refrigerator including the same according to the embodiment may expect the following effects.

In the embodiment, the fixing portion configured to fix the sealing member may be spaced a predetermined distance from the upper end of the head insertion portion to prevent the undercut from occurring. In addition, the fixing portion may be singly provided on the outer surface of the head insertion portion to provide the simplified structure configured to fix the sealing member, thereby simplifying the injection molding process and improving the workability.

In the embodiment, when the filter rotates to be mounted, the filtering flow path may be connected to the water inlet and the water outlet to supply the purified water, and when the filter rotates to be separated, the bypass flow path may be connected to continuously supply the water even though the filter is removed. That is, the mounting and separation of the filter may be performed by the rotation thereof without the separate manipulation to convert the flow path, thereby more improving the convenience in use.

In addition, in the embodiment, the sealing member may include the sealing portion that protrudes outward from the upper portion of the sealing member to prevent the sealing member from being separated even though the filter rotates to be mounted and separated. In the embodiment, the sealing member may extend downward from the upper end of the fixing portion to surround the area of the corresponding portion of the head insertion portion, thereby more sealing the gap between the head and the housing cap.

Particularly, the sealing portion of the sealing member may have the O-ring shape having the circular cross-section. Therefore, when the filter is mounted, the inner surface of the head and the sealing portion may be in line contact with each other to minimize the contact area, thereby preventing the sealing member from being separated or detached even though the filter rotates.

In the embodiment, the sealing portion configured to seal the gap between the sealing member and the head and the hook portion to be hooked with the head insertion portion may be provided. Therefore, the sealing member may perform the effective sealing function by the sealing portion to maintain the mounted state without being separated from the head insertion portion by the hook portion.

Particularly, the fixing portion may protrude from the head insertion portion, and the sealing member may be firmly fixed by the protrusion portion. Here, even though one fixing portion is provided, the sealing member may be firmly fixed by the fixing structure of the hook portion. Particularly, although the separate protruding structure is not provided above the sealing portion, the sealing member may be firmly fixed.

In addition, as described above, the protruding structure may be minimized at the head insertion portion by the structure of the head insertion portion. Therefore, the filter or the housing cap may be easily molded, and also, when the filter or the housing cap is molded, the occurrence of the undercut may be prevented. In addition, due to the above-described structure, the post-processing may not be required to improve the productivity and the workability, and also, due to the simple mold structure, the defects may be prevented.

In addition, in the embodiment, the sealing member may be in surface contact with the outer surface of the head insertion portion, and thus, the sealing member may be easily mounted on the head insertion portion to improve the workability.

In addition, in another embodiment, the protrusion portion extending upward inside the upper end of the head insertion portion may be provided to more firmly fix the sealing member to the housing cap.

In another embodiment, the extension portion extending upward from the upper end of the sealing member may be further provided to more seal the gap between the upper end of the head insertion portion and the head.

What is claimed is:
1. A water purifying apparatus comprising:
   a head configured to connect to a water inlet tube and a water outlet tube;
   a filter housing configured to insert into the head, the filter housing being configured to couple to the head by rotation relative to the head;
   a filtering member accommodated inside the filter housing;
   a head insertion portion that is configured to insert into the head and that is configured to couple to the head, the head insertion portion having an upper end that is open, that is configured to receive water, and that is configured to discharge water;
   a fixing portion that protrudes from and extends along a circumferential surface of the head insertion portion;
   a protrusion portion that protrudes upward from the upper end of the head insertion portion and that extends along a circumference of the upper end of the head insertion portion; and
   a sealing member fixed to the fixing portion and disposed along the circumferential surface of the head insertion portion, the sealing member being configured to be in contact with an inner surface of the head to thereby seal a gap between the head and the head insertion portion,
   wherein the sealing member comprises:
      a sealing portion that protrudes outward from and extends along the circumferential surface of the head insertion portion and that is configured to be in close contact with the inner surface of the head,
      a hook portion disposed below the fixing portion and configured to be restricted by the fixing portion,
      a connection portion that connects the sealing portion to the hook portion, and
      an extension portion that extends upward from an upper end of the sealing portion and that is configured be in contact with the protrusion portion,
   wherein an inner circumferential surface of the extension portion is configured to be supported by an outer circumferential surface of the protrusion portion,
   wherein the protrusion portion defines a step that is recessed inward in a radial direction relative to the upper end of the head insertion portion, and
   wherein an outer diameter of the protrusion portion defined by the outer circumferential surface of the protrusion portion is less than an outer diameter of the circumference of the upper end of the head insertion portion.

2. The water purifying apparatus according to claim 1, wherein the filter housing comprises:
   a housing body having an opened top surface, the housing body defining a space that accommodates the filtering member; and
   a housing cap coupled to the opened top surface of the housing body.

3. The water purifying apparatus according to claim 1, wherein the head insertion portion comprises a support portion that is disposed below the fixing portion and that protrudes outward from and extends along the circumferential surface of the head insertion portion, the support portion being configured to be in contact with a lower end of the sealing member.

4. The water purifying apparatus according to claim 1, wherein the sealing portion has an O-ring shape having a circular cross-section, and
   wherein the sealing portion protrudes radially outward relative to the connection portion.

5. The water purifying apparatus according to claim 1, wherein an inner surface of the connection portion defines a groove that is recessed in a shape corresponding to the fixing portion.

6. The water purifying apparatus according to claim 1, wherein a thickness of the hook portion in a horizontal direction is greater than a thickness of the connection portion in the horizontal direction.

7. The water purifying apparatus according to claim 1, wherein the protrusion portion has an outer diameter larger than an inner diameter of the head insertion portion.

8. The water purifying apparatus according to claim 1, wherein the extension portion comprises:
   a first extension portion that protrudes in a central direction of the head insertion portion and that is disposed at a position corresponding to the protrusion portion; and
   a second extension portion that extends downward from a lower end of the first extension portion and that is connected to the sealing portion, and
   wherein a thickness of the first extension portion in a horizontal direction is greater than a thickness of the second extension portion in the horizontal direction.

9. A refrigerator comprising:
   a cabinet that defines a storage space;
   a door configured to open and close at least a portion of the storage space; and
   a water purifying apparatus provided in the storage space and configured to purify water,
   wherein the water purifying apparatus comprises:
      a head configured to connect to a water inlet tube and a water outlet tube,
      a filter housing configured to insert into the head, the filter housing being configured to couple to the head by rotation relative to the head,
      a filtering member accommodated inside the filter housing,
      a head insertion portion that is configured to insert into the head and that is configured to couple to the head, the head insertion portion having an upper end that is open, that is configured to receive water, and that is configured to discharge water,
      a fixing portion that protrudes from and extends along a circumferential surface of the head insertion portion,
      a protrusion portion that protrudes upward from the upper end of the head insertion portion and that extends along a circumference of the upper end of the head insertion portion, and
      a sealing member fixed to the fixing portion and disposed along the circumferential surface of the head insertion portion, the sealing member being configured to be in contact with an inner surface of the head to thereby seal a gap between the head and the head insertion portion,
   wherein the sealing member comprises:
      a sealing portion that protrudes outward from and extends along the circumferential surface of the head insertion portion and that is configured to be in close contact with the inner surface of the head,
      a hook portion disposed below the fixing portion and configured to be restricted by the fixing portion,
      a connection portion that connects the sealing portion to the hook portion, and
      an extension portion that extends upward from an upper end of the sealing portion and that is configured be in contact with the protrusion portion,
   wherein an inner circumferential surface of the extension portion is configured to be supported by an outer circumferential surface of the protrusion portion,
   wherein the protrusion portion defines a step that is recessed inward in a radial direction relative to the upper end of the head insertion portion, and
   wherein an outer diameter of the protrusion portion defined by the outer circumferential surface of the protrusion portion is less than an outer diameter of the circumference of the upper end of the head insertion portion.

10. The refrigerator according to claim 9, wherein an inner surface of the connection portion defines a groove that is recessed in a shape corresponding to the fixing portion.

11. The refrigerator according to claim 9, wherein a thickness of the hook portion in a horizontal direction is greater than a thickness of the connection portion in the horizontal direction.

12. The refrigerator according to claim 9, wherein the head insertion portion comprises a support portion that is disposed below the fixing portion and that protrudes outward from and extends along the circumferential surface of the head insertion portion, the support portion being configured to be in contact with a lower end of the sealing member.

13. The refrigerator according to claim 9, wherein the extension portion comprises:
   a first extension portion that protrudes in a central direction of the head insertion portion and that is disposed at a position corresponding to the protrusion portion; and
   a second extension portion that extends downward from a lower end of the first extension portion and that is connected to the second sealing portion, and
   wherein a thickness of the first extension portion in a horizontal direction is greater than a thickness of the second extension portion in the horizontal direction.

14. The water purifying apparatus according to claim 1, wherein the inner circumferential surface of the extension portion is configured to be in contact with the outer circumferential surface of the protrusion portion.

15. The water purifying apparatus according to claim 1, wherein the outer diameter of the protrusion portion is equal to an inner diameter of the extension portion defined by the inner circumferential surface of the extension portion.

16. The water purifying apparatus according to claim 1, wherein the protrusion portion defines a minimum outer diameter of the head insertion portion.

17. The water purifying apparatus according to claim 1, wherein the inner circumferential surface of the extension portion extends straight along the outer circumferential surface of the protrusion portion such that an entire upper end of the protrusion portion is exposed to the head.

18. A water purifying apparatus comprising:
- a head configured to connect to a water inlet tube and a water outlet tube;
- a filter housing configured to insert into the head, the filter housing being configured to couple to the head by rotation relative to the head;
- a filtering member accommodated inside the filter housing;
- a head insertion portion that is configured to insert into the head and that is configured to couple to the head, the head insertion portion having an upper end that is open, that is configured to receive water, and that is configured to discharge water;
- a fixing portion that protrudes from and extends along a circumferential surface of the head insertion portion;
- a protrusion portion that protrudes upward from the upper end of the head insertion portion and that extends along a circumference of the upper end of the head insertion portion; and
- a sealing member fixed to the fixing portion and disposed along the circumferential surface of the head insertion portion, the sealing member being configured to be in contact with an inner surface of the head to thereby seal a gap between the head and the head insertion portion, wherein the sealing member comprises:
- a sealing portion that protrudes outward from and extends along the circumferential surface of the head insertion portion and that is configured to be in close contact with the inner surface of the head,
- a hook portion disposed below the fixing portion and configured to be restricted by the fixing portion,
- a connection portion that connects the sealing portion to the hook portion, and
- an extension portion that extends upward from an upper end of the sealing portion and that is configured be in contact with the protrusion portion, wherein an inner circumferential surface of the extension portion is configured to be supported by an outer circumferential surface of the protrusion portion, and wherein the inner circumferential surface of the extension portion extends straight along the outer circumferential surface of the protrusion portion such that an entire upper end of the protrusion portion is exposed to the head.

\* \* \* \* \*